(12) United States Patent
Hakspiel et al.

(10) Patent No.: US 10,408,639 B2
(45) Date of Patent: Sep. 10, 2019

(54) SHIFTING DEVICE OF A VEHICLE TRANSMISSION

(71) Applicants: Allegro MicroSystems, LLC, Worcester, MA (US); ZF Friedrichshafen AG, Friedrichshafen (DE)

(72) Inventors: Stefan Hakspiel, Meckenbeuren (DE); Thomas Kerdraon, Lenzkirch (DE); Andreas P. Friedrich, Metz-Tessy (FR)

(73) Assignees: ZF FRIEDRICHSHAFEN AG, Friedrichshafen (DE); ALLEGRO MICROSYSTEMS, LLC, Worcester, MA (US)

( * ) Notice: Subject to any disclaimer, the term of this patent is extended or adjusted under 35 U.S.C. 154(b) by 493 days.

(21) Appl. No.: 14/972,242

(22) Filed: Dec. 17, 2015

(65) Prior Publication Data

US 2016/0178401 A1 Jun. 23, 2016

(30) Foreign Application Priority Data

Dec. 19, 2014 (DE) .................. 10 2014 226 610

(51) Int. Cl.
*G01D 5/20* (2006.01)
*G01D 5/14* (2006.01)
*F16H 61/00* (2006.01)

(52) U.S. Cl.
CPC ............ *G01D 5/147* (2013.01); *F16H 61/00* (2013.01)

(58) Field of Classification Search
CPC ........ G01D 5/142; G01D 5/145; G01D 5/147; G01D 5/2013; G01B 7/14; F16H 61/00
See application file for complete search history.

(56) References Cited

U.S. PATENT DOCUMENTS

| 4,561,325 | A | * | 12/1985 | Jester | F16H 59/0217 74/473.34 |
|---|---|---|---|---|---|
| 4,592,249 | A | * | 6/1986 | Lehmann | F16H 59/70 116/28.1 |
| 5,299,143 | A | * | 3/1994 | Hellinga | G01D 5/142 324/207.12 |
| 5,777,465 | A | * | 7/1998 | Walter | G01D 5/147 123/146.5 A |
| 8,258,779 | B2 | | 9/2012 | Wenzel et al. | |

(Continued)

FOREIGN PATENT DOCUMENTS

DE 102009059906 A1 6/2011
WO WO 2010/057758 A1 5/2010

*Primary Examiner* — Patrick Assouad
*Assistant Examiner* — Haidong Zhang
(74) *Attorney, Agent, or Firm* — Dority & Manning, P.A.

(57) ABSTRACT

A shifting device with two positive-locking shifting element halves includes a positive connection between the shifting element halves that is able to be established or released. The respective prevailing operating states of the shifting element halves are determined through a sensor device. The surface areas of an encoder contour relative to a measuring device are formed in a convex or concave manner, whereas a perpendicular gap between the surface areas of the encoder contour and a permanent magnet, starting from a joint area between the surface areas in the direction of an end area of the surface areas increases or decreases in each case.

17 Claims, 4 Drawing Sheets

(56) References Cited

U.S. PATENT DOCUMENTS

| | | | |
|---|---|---|---|
| 2004/0189284 A1* | 9/2004 | Haubold | F15B 15/10 324/207.2 |
| 2006/0017432 A1* | 1/2006 | VunKannon, Jr. | G01D 5/2046 324/207.17 |
| 2008/0074104 A1* | 3/2008 | Sauer | G01D 5/145 324/207.22 |
| 2010/0127693 A1* | 5/2010 | Wenzel | F16H 59/70 324/207.2 |
| 2012/0119730 A1 | 5/2012 | Sánchez Expósito et al. | |

* cited by examiner

SHIFTING DEVICE OF A VEHICLE TRANSMISSION

FIELD OF THE INVENTION

The invention relates to a shifting device of a vehicle transmission.

BACKGROUND OF THE INVENTION

Shifting devices of vehicle transmissions known from practice are typically formed with two positive-locking shifting element halves that are connectable to each other in a torque-proof manner. In each case, the positive connection between the shifting element halves is established or released by means of a translational relative movement between the shifting element halves between a first operating state of the shifting element halves, at which the positive connection is established, and a second operating state of the shifting element halves, at which the positive connection is separated. As is well-known, the respectively prevailing operating states of the shifting element halves are determined by means of a sensor device, which features a permanent magnet, a measuring device for sensing the magnetic field of the permanent magnet and a ferromagnetic encoder contour that influences the magnetic field of the permanent magnet as a function of the operating states of the shifting element halves.

Thereby, various elements sensing magnetic fields are known, such as elements or magnetic resistance elements based on a resonating effect. Magnetic field sensors generally feature magnetic field-sensing elements or other electronic components, whereas some magnetic field sensors comprise permanent magnets in a so-called "back-biased arrangement."

Such magnetic field sensors make available electrical signals that reflect the state of a sensed magnetic field. With some versions, magnetic field sensors work together with ferromagnetic objects, whereas magnetic field variations, which are caused by the object moving through the magnetic field of a magnet of a magnetic field sensor, are determined through the magnetic field sensors. Thereby, as is well-known, the magnetic field monitored by the magnetic field sensor also varies as a function of a shape or a profile of the moving ferromagnetic object.

With additional versions, the magnetic field sensors are designed without a magnet, whereas the magnetic field sensor then generates information through a monitored object, which is connected to a magnet.

Based on the above properties, magnetic field sensors are often used by rotational speeds of ferromagnetic gear wheels, which determine the movement of the gear wheels in the area of gear teeth or areas of a gear wheel bounded by gear teeth. Typically, magnetic field sensors are designed with so-called "magnetic field sensor elements" which are connected to a differential amplifier in a differential arrangement.

With certain disadvantages, conventional magnetic field sensors, such as gear tooth sensors, make available an output signal, which is formed as a function of a relative position between the magnetic field sensor and a position of a gear wheel or a shaft in an axial, radial or diametrical direction along an axis of the shaft. However, in the field of vehicle transmission applications, it is desired that a magnetic field sensor delivers an output signal that generates a relative position between a magnetic field sensor and a target object in an axial direction. This request is to be fulfilled regardless of whether or not the target object is designed to be rotational around the translational direction of adjustment.

SUMMARY OF THE INVENTION

The present invention is subject to a task of making available a shifting device of a vehicle transmission with two positive-locking shifting element halves that are connectable to each other in a torque-proof manner, the current operating state of which across the entire operating range of the shifting device is known with little effort. Additional objects and advantages of the invention will be set forth in part in the following description, or may be obvious from the description, or may be learned through practice of the invention.

In accordance with the invention, this task is solved with a shifting device as described herein.

The shifting device in accordance with the invention of a vehicle transmission is formed with two positive-locking shifting element halves that are connectable to each other in a torque-proof manner. In each case, the positive connection between the shifting element halves is able to be established or released through a relative translational movement between the shifting element halves between a first operating state of the shifting element halves, at which the positive connection is established, and a second operating state of the shifting element halves, at which the positive connection is separated.

In each case, it is possible that only one shifting element half is designed to be displaceable, translationally or in an axial direction, relative to the respective other shifting element half, while the other shifting element half of the shifting device is fixed in an axial direction. Moreover, it can also be provided that both shifting element halves can be moved in an axial direction towards each other or away from each other, in order to establish or release the positive connection between the shifting element halves, preferably in the area of a claw toothing.

Regardless of this, the respective prevailing operating states of the shifting element halves can be determined through a sensor device or a magnetic field sensor, which includes a permanent magnet and a measuring device for sensing the magnetic field of the permanent magnet and works together with a ferromagnetic encoder contour that influences the magnetic field of the permanent magnet as a function of the operating states of the shifting element halves. The encoder contour comprises two surface areas that adjoin each other in a joint area, while the relative movement between the shifting element halves is guided in an extent corresponding to this translationally through the magnetic field of the permanent magnet, and, starting from the joint area in the direction of the end areas turned away from the joint area in an axial direction of the shifting element halves, is designed to be, at least in areas, monotonically increasing or monotonically decreasing.

In accordance with certain embodiments of the invention, the surface areas of the encoder contour relative to the measuring device are formed in a convex or concave manner. In addition, a perpendicular gap between the surface areas of the encoder contour and the permanent magnet, starting from the joint area in the direction of an end area of the surface areas, increases or decreases in each case.

Based on the rounded V-shape of the surface areas of the ferromagnetic encoder contour, which is preferably formed symmetrically to a symmetry axis of one of the shifting element halves, the current axial position of one of the shifting element halves or both shifting element halves can be measured by the magnetic field sensor, which is preferably designed as a linear differential magnetic field sensor in a so-called "back-biased arrangement." This is also possible if at least one of the shifting element halves rotates with a low rotational speed or a high rotational speed around its symmetry axis. In addition, the curvatures of the surface areas are optimized in such a manner that a specific magnetic linearization of the system is achieved relative to the movement of the shifting element halves.

If the surface areas of the encoder contour form a groove or a bump, whereas the side flanks that bound the groove or the bump and adjoin each other in the joint area each feature a curved cross-section, the shifting device can be produced in a cost-effective manner with a low need for installation space.

With a wear-free embodiment of the shifting device in accordance with the invention, the measuring device comprises at least two magnetic field sensor elements for sensing the magnetic field of the permanent magnet, by means of which electrical signals characterizing the current operating state of the magnetic field of the permanent magnet can be generated, the size of which in each case is dependent on a relative axial position between the measuring device and the encoder contour, which in turn corresponds to the operating states of the shifting element halves.

With an embodiment of the shifting device in accordance with the invention that is easy to operate, an arrangement of the magnetic field sensor elements to each other and relative to the direction of relative movement between the shifting element halves is selected in such a manner that a connecting line between the magnetic field sensor elements is parallel to the direction of relative movement.

With one design of the shifting device in accordance with the invention, the arrangement of the magnetic field sensor elements to each other and relative to the direction of relative movement between the shifting element halves can be adapted to the existing installation space in a vehicle transmission to the desired extent, if a connecting line between the magnetic field sensor elements is located in a plane that is parallel to the direction of relative movement and, with a perpendicular between the measuring device and the encoder contour, includes a right angle, whereas the connecting line located in the plane, with the direction of relative movement, includes an angle within an angular range of approximately +/−75°, preferably +/−20°.

In the event that the at least two magnetic field sensor elements generate unwanted direct current offsets, which may be identical or different in size, and the at least two magnetic field sensor elements feature different sensitivities, the signals generated in the area of the magnetic sensor elements are fed as input signals to a differential amplifier, in the areas of which, as a function of the difference arising between the two signals, a difference signal can be formed, the size of which in each case depends on a relative axial position between the measuring device and the encoder contour. Thereby, it is possible to carry out certain adjustments during a calibration period in the area of the differential amplifier. In the area of the differential amplifier, an input area and a course sensitivity adjustment can be provided, in order to adjust the signals of the two magnetic field sensor elements to such an extent that they correspond to signals from magnetic field sensing elements that essentially feature the same sensitivity.

For this purpose, it is possible to design the differential amplifier in such a manner that it generates an amplified output signal, which can be fed to a circuit, in the area of which a rough adjustment of an offset voltage can be carried out. Thereby, the circuit can be designed in such a manner that an offset adjustment signal is generated in its area and that the two magnetic field sensor elements designed with behavior that diverges from the other have an effect whether or not they can be operated with the same offset voltage or an offset voltage equal to zero.

With an additional embodiment of the shifting device in accordance with the invention that can be operated with little effort, the curvature of the surface areas of the encoder contour in each case is designed in such a manner that the output signal of the sensor device that depends on a relative axial position between the measuring device and the encoder contour features a course that is at least approximately linear.

In addition, with an additional form of the shifting device in accordance with the invention, the differential amplifier is connected to a linearization module, by means of which a linear signal depending on the relative axial position between the measuring device and the encoder contour can be generated with a course that is at least approximately linear, in order to determine the current operating state of the shifting device with little effort.

Furthermore, a clamping module connected to the linearization module may be provided, by means of which a clamp signal corresponding to a limited size range of the linear signal can be generated in order to limit the offset voltages in the area of the magnetic field sensor elements.

The offset voltages in the area of the magnetic field sensor elements thereby can also be limited if a clamping module connected to the differential amplifier is provided, by means of which a clamp signal corresponding to a limited size range of the difference signal can be generated.

If the encoder contour is provided in the area of a shifting rod connected to the shifting element halves, the sensor device can be arranged in an area within the vehicle transmission with little effort, which features or makes available an installation space necessary for the arrangement of the sensor device.

With an additional form of the shifting device in accordance with the invention, the shifting rod is connected to the shifting element through a bolt element clamping down on the shifting rod in the area of a piston element in a radial direction, in a structurally simple and cost-effective manner.

In order to, in a structurally simple manner, mount the shifting device in accordance with the invention with little effort and to avoid restrictions due to misalignments, with an additional form of the shifting device in accordance with the invention, one area of the piston element receiving the bolt element is designed with a diameter extending outwardly from a central area in a radial direction.

With an additional embodiment of the shifting device in accordance with the invention, the actuating force to be applied for actuating the positive connection at least in the area of one shifting element half or a component in operative connection with it can be hydraulically generated, whereas the area to be subjected to hydraulic fluid is sealed with little effort by a sealing device provided in the area of the sensor device.

With this invention, the term "magnetic field sensor element" encompasses a multitude of electronic elements that can be used for sensing a magnetic field. Thereby, the magnetic field sensor elements can be so-called "Hall elements," magnetic resistance elements or magnetotransistors. Thereby, various types of Hall elements, such as planar Hall elements, vertical Hall elements and circular vertical Hall elements (CVH) can be used. In addition, various types of magnetic resistance elements, such as semiconductor magnetic resistance elements made of indium-antimony (InSb), giant magnetic resistance elements, (GMR effect), such as so-called "spin valves," anisotropic magnetic resistance elements (AMR effect), tunnel magnetic resistance elements (TMR effect), and magnetic tunnel junctions (MTJ effect), are known.

The magnetic field sensor elements may feature individual elements or alternatively two or more magnetic field sensor elements, which are provided in various configurations, such as in a half-bridge or in a full bridge, for example a Wheatstone bridge.

Depending on the type of arrangement and further application needs, the magnetic field sensor element may be a IV-group compound semiconductor such as silicon (Si) or germanium (Ge), or a III-V-group compound semiconductor made of gallium arsenide (GaAs) or an indium mixture, such as indium antimony (InSb).

In addition, it is also known that some of the magnetic field sensor elements described above tend to feature, along an axis, a maximum sensitivity that is parallel to a substrate supporting the magnetic field sensor elements.

Additional versions of magnetic sensor elements feature axes with maximum sensitivity, which are at right angles to a substrate surface on which the one or more magnetic field sensor elements are arranged. In particular, planar Hall elements feature sensitivity axes perpendicular to a substrate, while metal-containing or metallic magnetic resistance elements, such as GMR, TMR, AMR and vertical Hall elements, have sensitivity axes that extend parallel to a surface of a substrate.

With this invention, the designation "magnetic field sensors" is understood to mean circuits that feature magnetic field sensor elements and are used in combination with other circuits. Magnetic field sensors are used, in particular, in the form of angle sensors for determining a direction of a magnetic field, current sensors for determining a magnetic field generated by a current-carrying conductor, magnetic switches that sense the position and proximity of a ferromagnetic object, rotation indicators that detect ferromagnetic rotating components, such as magnetic domains of ring magnets or ferromagnetic objects, such as gear wheels, with which the magnetic field sensor is used in connection with so-called "back-biased magnets" or the other magnets, and magnetic field sensors that sense the magnetic field density of a magnetic field.

Furthermore, with this invention, the term "processors" is understood to mean electronic circuits that perform functions, operations or a sequence of operations. The function, the operation or the sequence of operations may be either permanently stored in an electrical circuit (hard-coded) or stored in the form of instructions in a storage unit (soft-coded). Thereby, a processor performs the function, the operation or the sequence of operations by using digital values or analog signals.

With additional designs, the processor may be integrated into so-called "ASIC circuits" (Application Specific Integrated Circuit), whereas the ASIC circuit may be formed to be analog or digital. In addition, it is also possible that the processor is a component of a microprocessor with an associated program memory, or a component of an independent electronic circuit, which in turn may be formed to be analog or digital. In addition, the term "module" is also used for the description of a processor.

In principle, it is possible that a processor comprises internal processors or internal modules, which perform parts of functions, operations or sequences of operations of the processor. Similarly, a module may feature internal processors or internal modules that perform parts of one function, one operation or one sequence of operations of the module.

Through the use of the term "groove," notches, furrows or channels, which are provided (for example) in a target object, are described. The groove forms an indent or a recess in an outer or inner surface of the target object. Thereby, the groove may fully enclose the target object in a circumferential direction, or may be fully enclosed by it. With additional versions, it is possible that the groove extends over only one area of the surface of the target object.

A cross-section of the groove is essentially V-shaped with curved side surfaces, whereas a joint area is preferably formed in a tapering manner and forms an acute apex or vertex.

Depending on the particular application, it is also possible that the joint area is formed in a rounded or flattened shape.

With this invention, the term "ridge" is understood to mean an elevated area that is provided (for example) in the area of the outer or inner surface of a target object. As with the groove, the ridge may in turn fully enclose the target object or be fully enclosed by it, extending only across one part on the outer periphery or inside the target object. A cross-section of the ridge may be formed in a V-shape with curved sides, whereas the joint area may in turn be designed as a point or in a rounded or flattened shape.

Both the characteristics specified in the patent claims and the characteristics specified in the subsequent embodiments of the shifting device under the invention are, by themselves alone or in any combination with one another, suitable for providing additional forms under the invention.

Additional benefits and advantageous embodiments of the shifting device under the invention arise from the patent claims and the embodiments described below, with reference to the drawing in terms of principle, whereas, for the benefit of clarity, the same reference signs are used for structurally and functionally identical components.

BRIEF DESCRIPTION OF THE DRAWINGS

The following is shown.

DETAILED DESCRIPTION

Reference will now be made to the embodiments of the invention, one or more examples of which are shown in the drawings.

Figure 1:
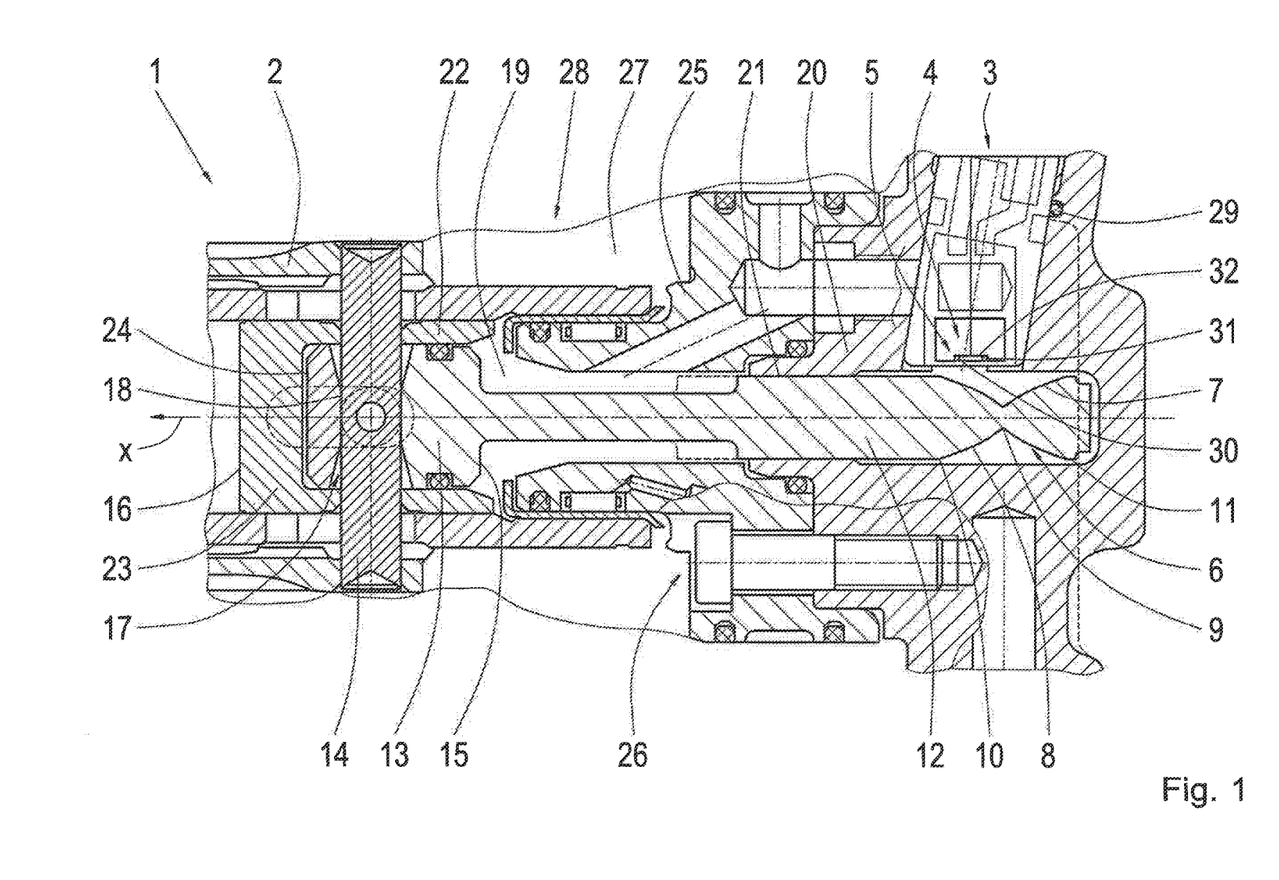
FIG. 1 is a partial longitudinal sectional view of a first embodiment of the shifting device in accordance with the invention.

FIG. 1 shows a partial sectional view of a first embodiment of a shifting device 1 of a vehicle transmission with two positive-locking shifting element halves 2 that are connectable to each other in a torque-proof manner, whereas FIG. 1 only shows one of the two shifting element halves 2. The positive connection between the shifting element halves 2 of the shifting device 1, designed in the present case as a dog shifting element or clutch, is established or released by a translational relative movement between the shifting element halves 2 between a first operating state of the shifting element halves 2, at which the positive connection is established, and a second operating state of the shifting element halves 2, at which the positive connection is separated.

The respectively prevailing operating states of the shifting element halves 2 can be determined by means of a sensor device 3, which features a permanent magnet 4, a measuring device 5 for sensing the magnetic field of the permanent magnet 4 and a ferromagnetic encoder contour 6 that influences the magnetic field of the permanent magnet as a function of the operating states of the shifting element halves 2.

Figure 2:
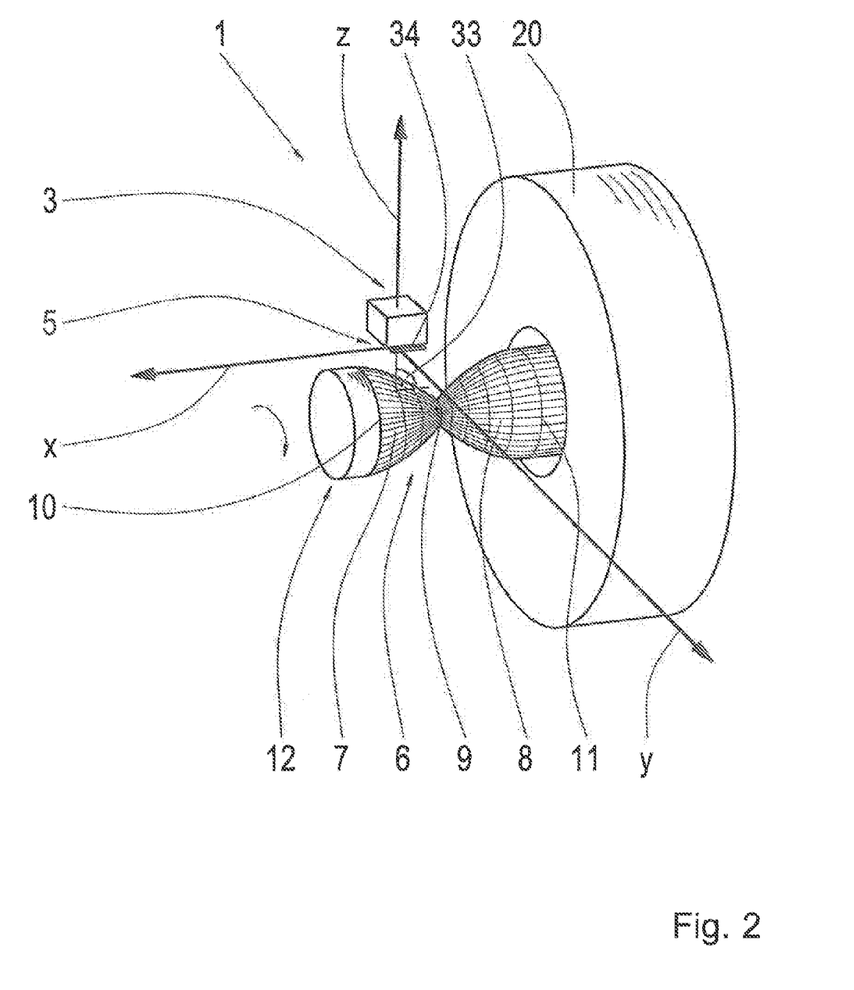
FIG. 2 is a schematic three-dimensional sectional view of the shifting device in accordance with FIG. 1, which shows a sensor device with a measuring device and an encoder contour that works together with it.

In FIG. 2, the area of the shifting device 1 and/or the vehicle transmission, as the case may be, comprising the sensor device 3 is partially shown in a schematic three-dimensional partial view. Both the presentation in accordance with FIG. 1 and the presentation in accordance with FIG. 2 show that the encoder contour 6 comprises two surface areas 7, 8 that adjoin each other in a joint area, while the relative movement between the shifting element halves 2 is guided in an extent corresponding to this translationally through the magnetic field of the permanent magnet 4, and, starting from the joint area 9 in the direction of the end areas 10, 11 turned away from the joint area 9 in an axial direction of the shifting element halves 2, is designed to be monotonically increasing.

The surface areas 7 and 8 of the encoder contour 6 are formed in a convex manner relative to the measuring device 5, by which the perpendicular gap between the surface areas 7, 8 of the encoder contour 6 and the permanent magnet 4, starting from the joint area 9 in the direction of the end areas 10, 11 of the surface areas 7, 8, decreases. With the embodiment of the shifting device 1 shown in FIG. 1, the encoder contour 6 is provided in the area of a shifting rod 12 connected to the shifting element halves 2, whereas, in this case, the groove of the encoder contour 6 extends fully across the entire circumference of the rotatable shifting rod 12. In contrast, with components to be sensed axially, which are designed to be torque-proof, it is possible that the encoder contour extends only across a partial area of the periphery of such a component.

The shifting rod 12 is connected to the shifting element half 2 through a bolt element 14 clamping down on the shifting rod 12 in the area of a piston element 13 in a radial direction and, in this case, the sensor device 3 is arranged in a manner adjacent to the shifting rod 12 made of ferromagnetic material and/or its encoder contour 6. In this case, an air gap is provided between the shifting rod 12 and/or its encoder contour 6 and the measuring device 5 of the sensor device 3. The size of the air gap depends on the field strength of the magnetic field that is sensed through the sensor device 3.

In this case, in the area of a front surface 15 and in the area of an additional front surface 16, the piston element 13 can be subjected to hydraulic actuating pressure, and is thereby axially displaceable along its symmetry axis, which in this case is referred to as an X-axis, both in the closing direction and in the opening direction of the shifting device 1. To compensate for radial tolerances and to facilitate the mounting of the shifting device 1 or the vehicle transmission that is designed for this, as the case may be, the piston rod 12 can be tilted in the area of the piston element 13 relative to the bolt element 14. For this purpose, one area 17 receiving the bolt element 14 is designed with a diameter extending outwardly from a central area 18 in a radial direction. To compensate for the resulting axial backlash between the piston rod 12 and the shifting element half 2, the hydraulic balance of forces in an oil chamber 19 bounded by the front surface 15 is selected such that the shifting rod 12 is always in contact with the right side of the central area 18 of the bolt element 14 turned towards the oil chamber 19. To seal the oil chamber 19, a sealing device 29 is provided in the area of the sensor device 3.

In the present case, the shifting element half 2 is designed to be rotatable and displaceable through the shifting rod 12 in an axial direction with respect to a component 20, in order to establish the positive connection with the additional shifting element half 2 (not shown here) of the claw shifting element of the vehicle transmission 28 to the desired extent. In this case, a slide bearing unit 21 is provided between the piston rod 12 and the component 20 enclosing the piston rod 12; through this, the shifting rod 12 is, alongside the additional slide bearings 22 and 23, supported in a radial direction. Thereby, the sliding layer of the slide bearing 21 can be provided both in a component 20 presenting a housing and through a sliding layer applied on the piston rod 12. A flat area 24 of the piston rod 12 is used for rotational orientation during assembly, while, at the same time, the bolt element 14 is provided as anti-rotation protection for the piston rod 12.

An oil feed bushing 25 connected to the component 20 is pressed onto the component 20, whereas the radial force absorption takes place through the pressing action. In addition, the oil feed bushing is screwed through a screw connection 26 relative to an interior chamber 27 of the vehicle transmission 28 from the inside, whereas tilting moments acting from the area of the oil feed bushing 25 are absorbed through the screw connection 26.

Alternatively, the oil feed bushing 25 is connected through the screw connection 26 to the component 20 only if, for reasons of weight and cost, the oil feed bushing 25 is produced from a different material, for example aluminum or an aluminum alloy, while the component 20 is still produced from steel, whereas the screw connection 26 generally can take place in relation to the interior chamber 27, both from the outside and from the inside.

Upon an axial adjustment of the shifting rod 12 along the X-axis, the encoder contour 6 passes the sensor device 3. The two surface areas 7 and 8 of the encoder contour 6 are formed in a convex manner relative to the measuring device 5 and form a groove, the side flanks of which that adjoin the joint area 9 therefore each feature a curved cross-section shown in more detail in FIG. 1.

In this case, the measuring device 5 comprises two magnetic field sensor elements 30, 31 formed as Hall elements, by means of which the magnetic field of the permanent magnet 4 can be sensed and which are arranged between the shifting rod 12 or the encoder contour 6, as the case may be, and the permanent magnet 5. Through the magnetic field sensor elements 30, 31, electrical signals characterizing the current operating state of the magnetic field of the permanent magnet 4 can be generated, the size of which in each case is dependent on a relative axial position between the measuring device 5 or its magnetic field sensor elements 30, 31, as the case may be, and the encoder contour 6, which in turn correspond to the operating states of the shifting element halves 2 of the shifting device 1.

An arrangement of the magnetic field sensor elements 30, 31 to each other and relative to the X-axis, which corresponds to the direction of relative movement between the shifting element halves 2, is selected such that a connecting line 32 between the magnetic field sensor elements 30, 31 runs parallel to the X-axis. With additional embodiments of the shifting device, an arrangement of the magnetic field sensor elements 30 and 31 to each other and relative to the X-axis or the direction of relative movement, as the case may be, between the shifting element halves 2 is selected such that the connecting line 32 between the magnetic field sensor elements 30, 31 is located in an XY plane spanning from the X-axis and a Y-axis, which is parallel to the X-axis or to the direction of relative movement, as the case may be, and, with a perpendicular 33 between the measuring device 5 and the encoder contour 6, includes a right angle. With the direction of relative movement or the X-axis, as the case may be, the connecting line 32 located in the XY plane in turn preferentially includes an angle lying within an angular range of approximately +/−75°, preferably +/−200.

In addition to the angular arrangement of the magnetic field sensor elements 30 and 31 with respect to the X-axis, described in more detail above, it is also possible to arrange the connecting line with respect to the XY plane in an X-Z-axis spanned by the X-axis and a Z-axis, whereas an angle between the connecting line 32 can be pivoted between the magnetic field sensor elements 30 and 31 and the XY plane in an angular range of +/−30°.

In this case, an output signal of the sensor device 3 represents the currently present axial position of the ferromagnetic shifting rod 12 relative to the measuring device 5 along the X axis. With additional embodiments of the shifting device in accordance with the invention, it can also be provided that the sensor device 3 is formed to be displaceable in respect of the encoder contour 6 that is then formed in an axial direction in a fixed location. In other applications, it can also be provided that both the encoder contour 6 and the sensor device 3 are designed to be axially displaceable along the X-axis. In addition, it is also possible that the shifting element half 2 or the shifting rod 12, as the case may be, is formed to be torque-proof and, by means of the sensor device 3, the respective axial position of the shifting element half 2 and the shifting rod 12 connected to it can be determined.

Below, the mode of action of the sensor device 3 is described in more detail on the basis of the illustrations of FIG. 1 and FIG. 2.

The two magnetic field sensor elements 30 and 31 sense the magnetic field of the permanent magnet 4, its height and orientation or angle, as the case may be, depending on how the axial position of the shifting rod 12 or its contour encoder contour 6, as the case may be, varies. This means that, upon a change to the relative position of the encoder contour 6 relative to the measuring device 5 or the magnetic field sensor elements 30 and 31, the output signal of the sensor device 3 changes.

In this case, the output signal of the sensor device 3 is a direct current signal that can be encoded in several ways. Thereby, it is possible that the output signal of the sensor device 3 is a so-called "pulse-width modulated" (PWM) signal. Upon a change to the relative position between the sensor device 3 and the ferromagnetic shifting rod 12 along the X-axis, the direct current signal of the measuring device 5 also changes at the same time. The signal is not a complete direct current signal; however, it changes if the relative position between the sensor device 3 or the magnetic field sensor, as the case may be, and the encoder contour 6 of the shifting rod 12 varies.

In this case, the two magnetic field sensor elements 30 and 31 are used in a so-called "differential arrangement," with which a difference between the electrical signals of the two magnetic field sensor elements 30 and 31 is formed. With additional embodiments of the shifting device in accordance with the invention, it is possible that the sensor device 3 is designed only with one magnetic field sensor element or with more than two magnetic field sensor elements, whereas, with an embodiment with only one magnetic field sensor element, the sensor device 3 is not operated in a differential arrangement. The advantages of a differential arrangement include, among other things, avoiding conventional operating noise.

In addition, the two magnetic field sensor elements 30 and 31 are arranged on a substrate 34 that is shown in more detail in FIG. 2, which is arranged between the shifting rod 12 or its encoder contour 6, as the case may be, and the permanent magnet 4. The two magnetic field sensor elements 30 and 31 comprise a component of an electronic circuit (not shown in more detail), in which the electric signals generated in the area of the magnetic field sensor elements 30 and 31 are further processed in the manner described in more detail below. In the area of the two magnetic field sensor elements 30 and 31, undesired direct current offsets arise, which could correspond to each other or differ from each other. Furthermore, it is possible that the magnetic field sensor elements 30 and 31 feature different sensitivities, which is not desired. For this reason, the signals of the two magnetic field sensor elements 30 and 31 are fed to a differential amplifier. By means of the differential amplifier, certain adjustments are performed during a calibration period of the electrical circuit. Thus, as an example, an input area can be provided and course sensitivity adjustments can be performed in the area of the differential amplifier, in order to correct the signals of the two magnetic field sensor elements 30 and 31 in such a manner that they correspond to electrical signals that were generated in the area of the magnetic sensor elements designed with the same sensitivity.

The differential amplifier is designed in such a manner that it generates an amplified signal that is forwarded to a circuit that is provided for the rough adjustment of an offset voltage. This circuit in turn generates an adjusted offset signal, in order to adjust the output signals of the two magnetic field sensor elements 30 and 31, as if they generate the same offset voltage or, during operation, do not output any offset voltage. In addition, an analog-to-digital converter (AD), for example a 12-bit A/D converter, is provided; it receives the corrected offset signal and converts it into a digital signal.

The digital signal is in turn fed to a signal processor, which features a spectrum and temperature equalization module. The spectrum and temperature equalization module filters the corrected offset signal and simultaneously performs a temperature equalization. In addition, it is also possible that the signal processor comprises a sensitivity and adjustment module, in order to perform a high sensitivity and an adjustment of the offset. In addition, with additional embodiments, the signal processor can also be formed with the linearization module, which can be coupled with the adjustment module. In the area of the linearization module, a linearized output signal is generated, which is linear with respect to the relative position between the two magnetic field sensor elements 30 and 31 and the encoder contour 6 of the shifting rod 12. In addition, the signal processor may also feature a clamping module, which receives the linearized output signal as an input signal and generates a clamped output signal. The clamped output signal represents a bounded version of the linearized output signal, whereas the bounding takes place as a function of individual value ranges and as a function of the conditions set out in more detail below.

With additional embodiments, the magnetic field sensor or the sensor device 3, as the case may be, is formed without the linearization module, whereas the clamping module is then connected directly to the circuits provided upstream.

The clamp signal is fed to an output formatting module, and is configured in order to generate an output signal proportional to the value of the clamp signal. With some embodiments, the output signal is a pulse-width modulated (PWM) signal with a duty factor that is proportional to the value of the clamp signal. In addition, certain areas of the duty factor of the pulse-width modulated output signal can be used for other purposes. For example, duty factors between 0% and 10% and duty factors between 90% and 100% are used to display fault states of the electrical circuit of the substrate 34. In addition, it can also be provided that the clamping module limits values of the clamp signal to values that generate duty factors in the range of 10% to 90%. Regardless of this, other ranges of duties factors can also be used.

With versions of the shifting device 1, for which the two magnetic field sensor elements 30 and 31 are Hall elements, the circuit can be designed with additional circuits, through which the Hall elements are clocked or in the area in which a spin-current is generated.

In addition to generating a pulse-width modulated output signal, the output signal may also feature other formats, such as a SENT format or an I2C format.

The linearity of the output signal of the sensor device 3 can be influenced by means of a variety of circuits and other factors. Thus, as an example, the linearity of the output signal of the sensor device 3 can be changed through the linearization module of the signal processor. In addition, the linearity of the output signal of the sensor device 3 can also be adjusted by the shape of the surface areas 7 and 8 of the encoder contour 6 and the shape of the joint area 9, whereas, with additional embodiments of the shifting device, the linearization of the output signal of the sensor device 3 can be controlled solely by the shape of the encoder contour 6, and the linearization module is not necessary.

Figure 3:
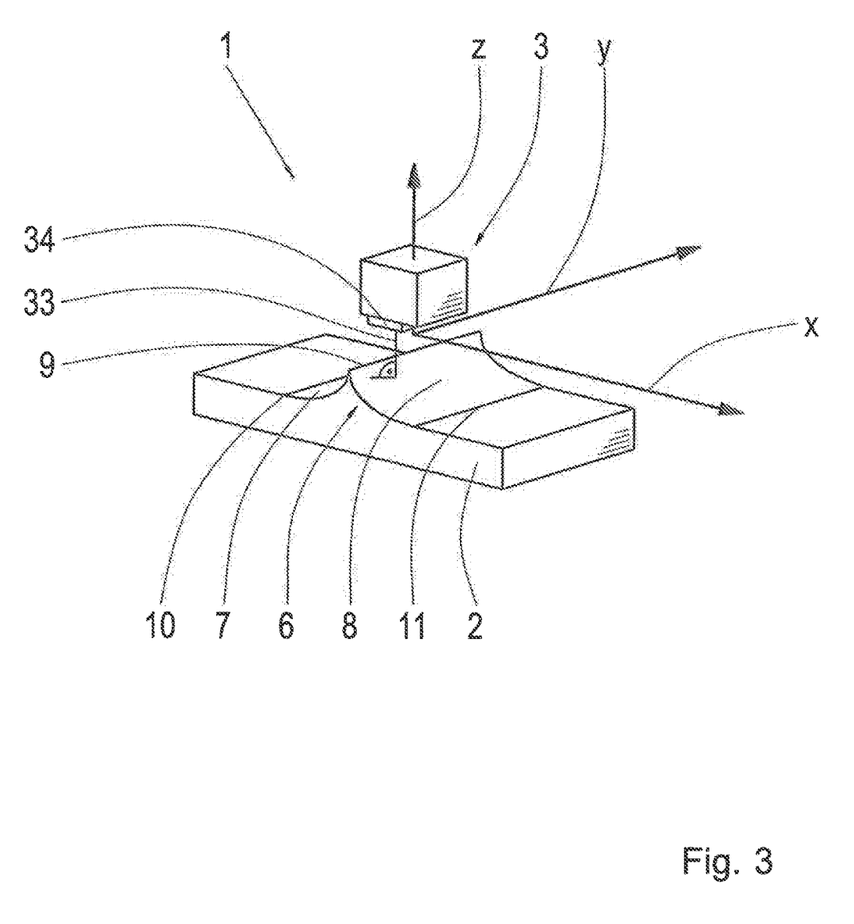
FIG. 3 is a schematic three-dimensional partial representation of a second embodiment of the shifting device in accordance with the invention.

FIG. 3 shows an additional embodiment of the shifting device in accordance with the invention, with which, instead of a groove relative to the sensor device 3, the encoder contour 6 forms a bump, and the surface areas 7 and 8 of the encoder contour 6 are formed in a concave manner relative to the measuring device 5. This results in the fact that a perpendicular gap between the surface areas 7 and 8 of the encoder contour 6 and the permanent magnet 4 are, starting from the joint area 9 in the direction of an end area 10 or 11, as the case may be, of the surface areas 7, 8 are respectively enlarged.

With respect to the further functioning of the shifting device 1 in accordance with FIG. 3, reference is made to the above description regarding FIG. 1 and FIG. 2.

Figure 4:
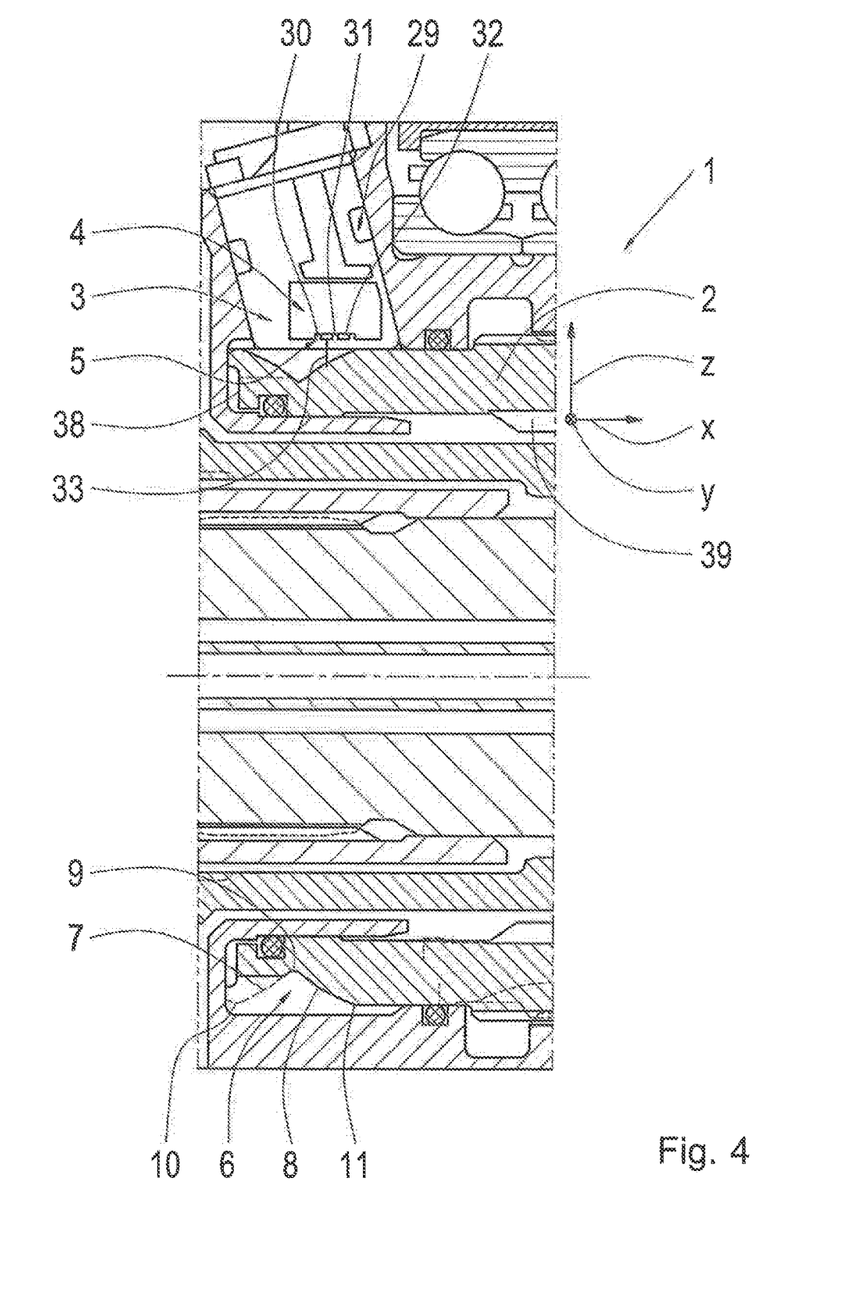
FIG. 4 is a sectional view of a third embodiment of the shifting device in accordance with the invention.

FIG. 4 shows a third embodiment of the shifting device 1 in accordance with the invention, with which the encoder contour 6 is provided directly in the area of the shifting element half 2. In this case, the shifting element half 2 is designed to be torque-proof, and, as a function of hydraulic pressure that can be applied in the area of a front surface 38 of the shifting element half 2, is displaceable in an axial direction. As a function of the respective axial position of the shifting element half 2, a claw toothing 39 of the shifting element 2 engages in a counter-toothing of the additional shifting element half of the shifting device 1 (which is not presented in more detail in FIG. 4). In order to once again release the toothing between the shifting element half 2 and the additional shifting element half, the shifting element half 2 in the area of an additional front surface is subjected to hydraulic pressure, and is displaceable into the end position shown in FIG. 4, in which the positive connection between the shifting element half 2 and the other shifting element half has been lifted.

The shifting device 1 in accordance with FIG. 4, except for the arrangement of the encoder contour 6 directly in the area of the shifting element half 2, essentially corresponds to the shifting device 1 in accordance with FIG. 1 and FIG. 2, which is why, with respect to the further functioning of the shifting device 1 in accordance with FIG. 4, reference is made to the description for FIG. 1 and FIG. 2.

Modifications and variations can be made to the embodiments illustrated or described herein without departing from the scope and spirit of the invention as set forth in the appended claims.

REFERENCE SIGNS

1 Shifting device
2 Shifting element half
3 Sensor device
4 Permanent magnet
5 Measuring device
6 Encoder contour
7, 8 Surface area of the encoder contour
9 Joint area of the encoder contour
10, 11 End area
12 Shifting rod
13 Piston element
14 Bolt element
15 Front surface
16 Additional front surface
17 Receiving area
18 Central area
19 Oil chamber
20 Component
21 Slide bearing unit
22, 23 Slide bearing
24 Flat area
25 Oil feed bushing
26 Screw connection
27 Interior chamber
28 Vehicle transmission
29 Sealing device
30, 31 Magnetic field sensor element
32 Connecting line
33 Perpendicular
34 Substrate
38 Front surface
39 Claw toothing

The invention claimed is:

1. A shifting device of a vehicle transmission, comprising:
a dog clutch with two positive-locking shifting element halves connectable to each other, wherein a positive connection between the shifting element halves is established or released through a relative translational movement between the shifting element halves between a first operating state in which the positive connection is established and a second operating state in which the positive connection is separated, the shifting element halves rotatable about a direction of relative movement between the shifting element halves;
a sensor device comprising a permanent magnet and a measuring device disposed to sense a magnetic field of the permanent magnet;

a ferromagnetic encoder contour that influences the magnetic field of the permanent magnet as a function of the first and second operating states of the shifting element halves, the encoder contour comprising two surface areas that adjoin each other in a joint area, the encoder contour fixed relative to one of the shifting element halves such that the encoder contour is rotatable about the direction of relative movement, the encoder contour being circumferentially symmetrical about the direction of relative movement;

the surface areas of the encoder contour formed in a convex or concave manner between opposite end areas relative to the measuring device such that a perpendicular gap is established between the surface areas of the encoder contour and the permanent magnet that, starting from the joint area, increases or decreases in a direction towards the end areas; and wherein relative movement between the shifting element halves is guided translationally through the magnetic field of the permanent magnet such that the magnetic field sensed by the sensor device monotonically increases or monotonically decreases as a function of axial change of position of the joint area of the encoder surface areas relative to the sensor device, the sensor device configured to output a signal indicative of a current operating state of the shifting element halves based upon the magnetic field sensed by the sensor device.

2. The shifting device according to claim 1, wherein the surface areas of the encoder contour form a groove or a bump having side flanks that adjoin each other in the joint area and have a curved cross-section.

3. The shifting device according to claim 1, wherein the shifting device comprises at least two magnetic field sensor elements disposed to sense the magnetic field of the permanent magnet and generate electrical signals having a value that is dependent on a relative axial position between the measuring device and the encoder contour, the electrical signals thereby indicating the operating states of the shifting element halves.

4. The shifting device according to claim 3, wherein the magnetic field sensor elements are arranged relative to each other and to the direction of relative movement between the shifting element halves such that a connecting line between the magnetic field sensor elements is parallel to the direction of relative movement.

5. The shifting device according to claim 3, wherein the magnetic field sensor elements are arranged relative to each other and to the direction of relative movement between the shifting element halves such that a connecting line between the magnetic field sensor elements is located in an X-Y plane that is parallel to the direction of relative movement and forms a right angle with a perpendicular line from the measuring device to the encoder contour, the connecting line located in the X-Y plane within an angular range of +/−75° relative to the direction of relative movement.

6. The shifting device according to claim 3, wherein the signals from the magnetic field sensing elements are input signals to a differential amplifier that generates a difference signal from the input signals having a value that depends on a relative axial position between the measuring device and the encoder contour.

7. The shifting device according to claim 6, further comprising a clamping module connected to the differential amplifier, the clamping module configured to generate a clamped output signal.

8. The shifting device according to claim 6, wherein the surface areas of the encoder contour have a curvature such that an output signal of the sensor device that depends on a relative axial position between the measuring device and the encoder contour is linear.

9. The shifting device according to claim 8, further comprising a linearization module connected to the differential amplifier, the linearization module configured generate a linear output signal that is linear with respect to the relative position between the magnetic field sensor elements and the encoder contour.

10. The shifting device according to claim 9, further comprising a clamping module connected to the linearization module, the clamping module configured generate a clamped output signal.

11. The shifting device according to claim 1, wherein the encoder contour is provided in a shifting rod connected to the one of the shifting element halves.

12. The shifting device according to claim 11, further comprising a piston element connected to the shifting rod, the shifting rod connected to the one of the shifting element halves with a bolt element that couples to the shifting rod at the piston element.

13. The shifting device according to claim 12, wherein an area of the piston element that receives the bolt element has a diameter that increases outwardly in a radial direction.

14. The shifting device according to claim 12, wherein the piston element is hydraulically actuated to shift the shifting element halves between the first and second operating states, and further comprising a hydraulic sealing device adjacent the sensor device to seal a hydraulic fluid area in which the sensor device is disposed.

15. The shifting device according to claim 1, wherein the encoder contour is provided in one of the shifting element halves.

16. The shifting device according to claim 1, wherein the encoder contour is formed on the one of the shifting element halves or on a shifting rod that is coupled to the one of the shifting element halves.

17. The shifting device according to claim 16, wherein the encoder contour extends around a circumference of the one of the shifting element halves or the shifting rod.

* * * * *